«2,968,662
Patented Jan. 17, 1961»

2,968,662

6-HALO-6-DEHYDRO DERIVATIVES OF 11-OXYGENATED-9α-HALOPROGESTERONES

Howard J. Ringold, Carl Djerassi, Albert Bowers, and Mercedes Velasco, all of Mexico City, Mexico, assignors to Syntex S.A., Mexico City, Mexico, a corporation of Mexico No Drawing. Filed Dec. 30, 1959, Ser. No. 862,797

Claims priority, application Mexico Mar. 4, 1959

13 Claims. (Cl. 260—397.3)

This invention relates to certain new cyclopentanophenanthrene derivatives, and more particularly to certain novel 6-halo-6-dehydro-derivatives of 11-oxygenated 9α-halo-progesterones. More specifically it relates to such compounds wherein the substitutent at C-6 is fluorine, chlorine, or bromine and the substituent at C-9 is either fluorine, chlorine, bromine or iodine.

The novel compounds according to the invention are potent therapeutical agents with very marked progestational action, while being surprisingly low in undesirable androgenic activity.

These new compounds are represented by the following general formula

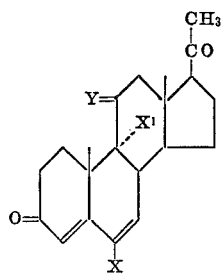

in which Y is selected from the group consisting of =O and

X is selected from the group consisting of fluorine, chlorine and bromine; and $X^1$ is selected from the group consisting of fluorine, chlorine and bromine; moreover, when Y is

the halogen substituent at C-9α can also be iodine.

The novel compounds according to the invention are prepared by a process illustrated in the following reaction diagram, in which $X^1$ and Y have the meaning explained above, $X^2$ and $X^3$ represent either chlorine or bromine, and R represents a lower alkyl such as, for instance, ethyl.

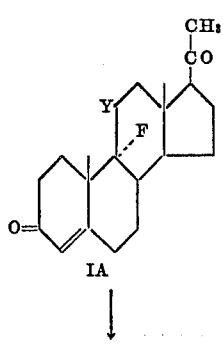

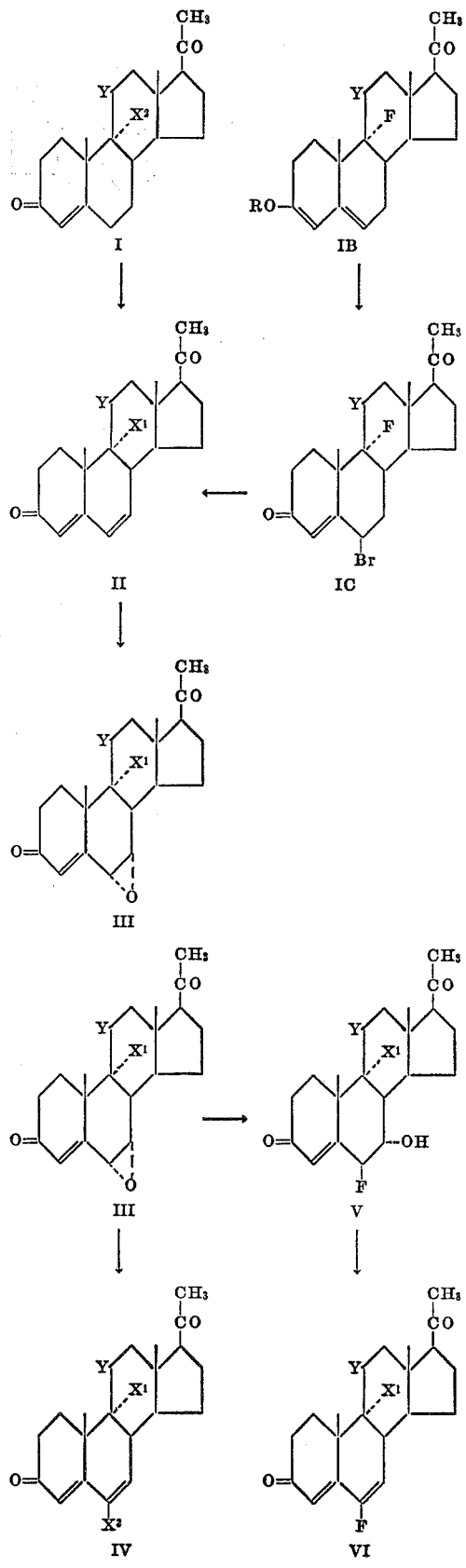

In a first phase of the above illustrated process, a double bond is introduced between C-6 and C-7 into the starting compound which can be substituted at C-9α by chlorine or bromine (I), fluorine (IA) or iodine (IE below) to obtain the corresponding Δ⁴,⁶-derivative II.

The 9α-iodo starting compound IE was obtained according to the reaction

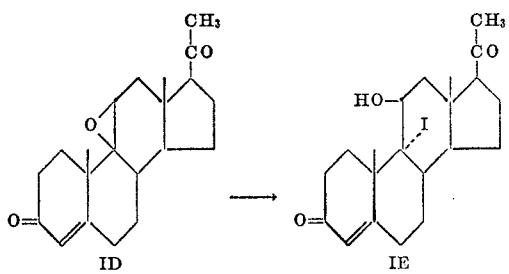

by treating 9β, 11β-oxido-progesterone (ID) described by Fried et al. in J. Am. Chem. Soc. 77, 1068 (1955), with hydroiodic acid.

The desired introduction of the double bond between C-6 and C-7 was carried out, for example, by refluxing with chloranil in mixture with ethyl acetate and acetic acid; alternatively, in particular if the 9α-substituent was fluorine, the 4-en-3-ones were first converted into their 6β-bromo derivatives (IC), for example, by reaction of their 3-ethylenolethers (IB) with N-bromosuccinimide in aqueous acetone and in the presence of a buffer; compounds (IC) were then dehydrobrominated, either by reaction with calcium carbonate in mixture wtih dimethylacetamide or by refluxing with a tertiary amine such as collidine.

In the next process phase, reaction of the Δ⁴,⁶-3-ketones (II) obtained from the first phase, with a peracid, such as monoperphthalic acid or perbenzoic acid, followed by purification of the oxidation product, yielded the respective 6α, 7α-oxido-Δ⁴-3-keto compounds (III).

The treatment of these oxido compounds with a dry hydrogen halide, such as hydrogen chloride or hydrogen bromide, in an organic solvent, furnished directly the 6-chloro-6-dehydro- or the 6-bromo-6-dehydro compounds (IV).

Adequate organic solvents in the reaction step from III to IV are, e.g. lower aliphatic carboxylic acids, ketones, halogenated hydrocarbon or esters, or mixtures of such solvents; typical such solvents are acetic acid, propionic acid, acetone, methylene chloride, chloroform and tetrahydrofurane.

Alternatively, in particular where the 9α-substituent is fluorine, treatment of the 6α,7α-oxido compounds (III) with the halohydrides of tertiary amines such as pyridine or dimethylaniline, furnished the respective 6β-halo-7α-hydroxy compounds (V); optionally, the 6β-fluoro-7α-hydroxy compounds were obtained by reaction of the 6,7-oxido compounds (III) with anhydrous hydrogen fluoride in tetrahydrofurane-chloroform. Compounds (V) were then treated with dry hydrogen chloride in an organic solvent to introduce the double bond between C–6 and C–7 and obtain the desired 6-fluoro-6-dehydroprogesterone compound (VI).

The invention is further illustrated but not limited by the following examples:

*Example 1*

A mixture of 5 g. of 9α-bromo-11β-hydroxyprogesterone described by Fried et al. in J. Am. Chem. Soc. 77, 1068 (1955), 10 g. of chloranil, 125 cc. of ethyl acetate and 25 cc. of acetic acid was heated under reflux in an atmosphere of nitrogen for 20 hours. The solution was then cooled, washed with 10% aqueous sodium hydroxide solution until the washings were colorless, dried over anhydrous sodium sulfate and evaporated to dryness under reduced pressure. Crystallization from acetone-hexane after decolorization with activated charcoal, afforded 9α-bromo-11β-hydroxy-6-dehydro-progesterone.

A solution of 3 g. of the above compound in 300 cc. of methylene chloride was treated with 150 cc. of a 5.5% solution of monoperphthalic acid in ether (6 molar equivalents) and kept for 24 hours at room temperature, the mixture was then washed with 5% aqueous sodium carbonate solution and water, dried over anhydrous sodium sulfate and concentrated until crystallization started. The mixture was cooled and the precipitate collected by filtration and air dried. There was thus obtained 9α-bromo-6α, 7α-oxido-Δ⁴-pregnen-11β-ol-3,20-dione.

A solution of 2 g. of the above last mentioned epoxide in 160 cc. of anhydrous chloroform was cooled in a Dry Ice-acetone bath at —70° C. and treated cautiously with a mixture of 4.5 cc. of anhydrous tetrahydrofurane and 3.2 g. of dry hydrogen fluoride, under stirring. The reaction mixture was allowed to reach room temperature and kept for 20 hours at this temperature, it was then poured into a stirred solution of 1 lt. of 5% aqueous potassium carbonate solution, mixed with ice. The organic layer was separated, washed with water to neutral, dried over anhydrous sodium sulfate and evaporated to dryness. This residue consisted of the crude 6β-fluoro-9α-bromo-7α,11β-dihydroxy-progesterone.

A slow stream of dry hydrogen chloride was introduced into a solution of 2 g. of the above compound in 100 cc. of glacial acetic acid until saturation, and then the container stoppered and kept at room temperature for 4 hours; after pouring into ice cold salt solution, the product was extracted with methylene chloride, the extract was washed with 5% aqueous sodium carbonate solution and water, dried over anhydrous sodium sulfate and evaporated to dryness. After chromatography of the crude product on silica gel, the pure 6-fluoro-9α-bromo-11β-hydroxy-6-dehydro-progesterone was obtained.

*Example 2*

A slow stream of dry hydrogen chloride was introduced, at 15–18° C., into a suspension of 1 g. of 9α-bromo-11β-hydroxy-6α,7α-oxido-Δ⁴-pregnen - 3,20 - dione, prepared in accordance with Example 1, in 35 cc. of glacial acetic acid, after a short time, the solid material entered into solution and the treatment with dry hydrogen chloride was continued at room temperature for a total of 5 hours. The mixture was concentrated to one third of its original volume by distillation under reduced pressure, without heating, was then poured into ice water and the precipitate was collected by filtration, washed with water to neutral, dried and recrystallized from acetone-ether; there was thus obtained 6-chloro-9α-bromo-11β-hydroxy-6-dehydro-progesterone.

*Example 3*

In the method of the previous example the stream of dry hydrogen chloride was substituted by a stream of dry hydrogen bromide which was introduced for 1 hour, thus furnishing 6,9α - dibromo - Δ⁴,⁶ - pregnadien-11β-ol-3,20-dione.

*Example 4*

By the method described in Example 1, 9α-chloro-11β-hydroxy-progesterone, was converted successively into the 6-dehydro-derivative, then into 9α-chloro-6α,7α-oxido-11β-hydroxy-progesterone, 6β-fluoro-9α-chloro-7α,11β-hydroxy-progesterone and finally into 6-fluoro-9α-chloro-11β-hydroxy-6-dehydro-progesterone.

*Example 5*

In accordance with the method of Example 1, 9α-chloro-11-keto-progesterone was converted into 9α-chloro-11-keto-6-dehydro-progesterone. By the epoxidation method of the same example, this compound was converted into the corresponding 6α,7α-oxido steroid.

500 mg. of this epoxide were treated with gaseous hydrogen chloride in glacial acetic acid, by the method of Example 2, thus affording 6,9α-dichloro-11-keto-6-dehydro-progesterone.

Example 6

To a solution of 5 g. of 9α-fluoro-11-keto-progesterone in 50 cc. of anhydrous dioxane there were added 6 cc. of ethyl orthoformate and 200 mg. of p-toluenesulfonic acid and the mixture was stirred until the color turned to emerald green, which occurred in about 30 minutes; 5 cc. of pyridine was then added, then the color changed to yellow, and the mixture was poured into water and cooled. The precipitate was collected, washed with water, dried and recrystallized from methanol containing a little pyridine. There was thus obtained 9α-fluoro-3-ethoxy-Δ$^{3,5}$-pregnadiene-11,20-dione.

A mixture of 5 g. of the above compound, 140 cc. of acetone, 1.6 g. of anhydrous sodium acetate and 16 cc. of water was cooled to 0° C. and treated with 5 g. of N-bromo-succinimide followed by 1.6 cc. of glacial acetic acid, under continuous stirring. The mixture was kept at 0° C. for 2 hours further, poured into water and the precipitate formed was collected, washed with water, dried and recrystallized from acetone-ether. There was thus obtained 6β-bromo-9α-fluoro-Δ$^4$-pregnene-3,11,20-trione.

A solution of 3 g. of the above compound in 10 cc. of dimethylformamide was added to a vigorously stirred suspension of 1.5 g. of calcium carbonate in 30 cc. of dimethylformamide which had previously been heated nearly to boiling and the mixture was refluxed for 15 minutes. The cooled mixture was poured into water, acidified with hydrochloric acid and the precipitate was collected, washed with water, dried and recrystallized from acetone-hexane, thus yielding 9α-fluoro-Δ$^{4,6}$-pregnadiene-3,11,20-trione.

A solution of 2 g. of the latter compound in 150 cc. of methylene chloride, was treated with 6 molar equivalents of a 6.8% solution of perbenzoic acid in chloroform, and the reaction mixture allowed to stand at 5° C. for 48 hours, (until one mol equivalent of the peracid had been consumed). It was then washed with 5% aqueous sodium carbonate solution and water, dried over anhydrous sodium sulfate and concentrated until crystallization started. Filtration of the crystalline compound gave 9α-fluoro-6α,7α-oxido-Δ$^4$-pregnene-3,11,20-trione.

In accordance with the method of Example 2, the preceding oxide was converted into 6-chloro-9α-fluoro-Δ$^{4,6}$-pregnadiene-3,11,20-trione i.e. 6-chloro-9α-fluoro-6-dehydro-11-keto-progesterone.

Example 7

By following the dehydrogenation method described in Example 1, 9α-bromo-11-keto-progesterone was converted into the corresponding 9α-bromo-6-dehydro-11-keto-progesterone. In accordance with the epoxidation method of the same example, the latter compound was treated, in chloroform solution, with an ethereal solution containing 6 molar equivalents of monoperphthalic acid, and the mixture was kept for 24 hours at room temperature. The crude product was isolated and finally purified by chromatography on alumina, thus yielding 6α,7α-oxido-9α-bromo-11-keto-progesterone.

A solution of 2 g. of the above compound in 100 cc. of glacial acetic acid was treated with dry hydrogen chloride for 3 hours at 15° C. After precipitation with water followed by chromatography of the product on neutral alumina there was obtained 6-chloro-9α-bromo-Δ$^{4,6}$-pregnadiene-3,11,20-trione.

Example 8

In the method of the previous example the stream of dry hydrogen chloride was substituted by a stream of dry hydrogen bromide which was introduced for 1 hour; there was thus obtained 6,9α-dibromo-Δ$^{4,6}$-pregnadiene-3,11,20-trione.

Example 9

A mixture of 2 g. of 9α-bromo-6α,7α-oxido-Δ$^4$-pregnen-11β-ol-3,20-dione, intermediate of Example 1, 4 g. of pyridine hydrochloride and 100 cc. of methanol was refluxed for 3 hours under anhydrous conditions, then diluted with water and the product was extracted with ethyl acetate, washed with water, dried over anhydrous sodium sulfate and evaporated to dryness, thus giving 6β-chloro-9α-bromo-Δ$^4$-pregnen-7α,11β-diol - 3,20 - dione; this latter compound was treated with a stream of dry hydrogen chloride in glacial acetic acid solution, in accordance with the method described in Example 1, to furnish finally 6-chloro-9α-bromo-Δ$^{4,6}$-pregnadien-11β-ol-3,20-dione, identical to that obtained in Example 2.

Example 10

A solution of 200 mg. of 9β,11β-oxido-progesterone described by Fried et al. in J. Am. Chem. Soc. 77, 1068, 1955, in 20 cc. of chloroform was treated with 0.4 cc. of recently distilled 55% aqueous hydroiodic acid and the mixture was stirred for 20 minutes. Water was then added and the chloroform layer was washed with sodium sulfite solution and water, dried over anhydrous sodium sulfate and evaporated to dryness under vacuum at room temperature.

The residue was crystallized from ethyl acetate at a temperature below 40° C., thus furnishing 9α-iodo-11β-hydroxyprogesterone.

In accordance with the method of Example 1, the latter compound was converted successively into 9α-iodo-Δ$^{4,6}$-pregnadien - 11β - ol - 3,20 - dione, 9α - iodo - 6α,7α-oxido - Δ$^4$ - pregnen - 11β - ol - 3,20 - dione, 9α - iodo-6β - fluoro - Δ$^4$ - pregnen - 7α,11β - diol - 3,20 - dione and finally into 6β-fluoro-9α-iodo-Δ$^{4,6}$-pregnadien-11β-ol-3,20-dione.

Example 11

By following the method of Example 1, 9α-fluoro-11β-hydroxy-progesterone was converted into 6,9α-difluoro-Δ$^{4,6}$-pregnadiene-11β-ol-3,20-dione.

Example 12

Example 7 was repeated; however, by reaction of 6α,7α-oxido-9α-bromo-11-keto-progesterone with dry hydrogen chloride in glacial acetic acid, for approximately 2 hours at a temperature around 25° C., followed by isolation and purification, there was obtained 6-chloro-6-dehydro-9α-bromo-11-keto-progesterone in a 30% yield.

Example 13

In accordance with the method of Example 3, 9α-fluoro-6α,7α-oxido-Δ$^4$-pregnene-11β-ol-3,20-dione, intermediate in Example 11, was converted into 6-bromo-9α-fluoro-Δ$^{4,6}$-pregnadien-11β-ol-3,20-dione.

Example 14

By applying the same method of Example 3, 6α,7α-oxido-9α-chloro-11β-hydroxy-progesterone, intermediate in Example 4, afforded 6-bromo-9α-chloro-11β-hydroxy-6-dehydro-progesterone.

What is claimed is:
1. A compound corresponding to the general formula:

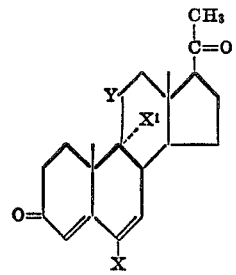

wherein X is selected from the group consisting of fluorine, chlorine and bromine, X' is selected from the group consisting of fluorine, chlorine and bromine, and Y is selected from the group consisting of =O and

2. 6 - chloro - 9α - bromo - Δ$^{4,6}$ - pregnadiene - 3,11,20-trione.
3. 6,9α - dibromo - Δ$^{4,6}$ - pregnadiene - 3,11,20 - trione.
4. 6 - fluoro - 9α - bromo - Δ$^{4,6}$ - pregnadien - 11β - ol-3,20-dione.
5. 6 - chloro - 9α - bromo - Δ$^{4,6}$ - pregnadien - 11β - ol-3,20-dione.
6. 6,9α - dibromo - Δ$^{4,6}$ - pregnadien - 11β - ol - 3,20-dione.
7. 6 - fluoro - 9α - chloro - Δ$^{4,6}$ - pregnadien - 11β - ol-3,20-dione.
8. 6,9α - dichloro - Δ$^{4,6}$ - pregnadiene - 3,11,20 - trione.
9. 6 - chloro - 9α - fluoro - Δ$^{4,6}$ - pregnadiene - 3,11,20-trione.
10. 6,9α - difluoro - Δ$^{4,6}$ - pregnadien - 11β - ol - 3,20-dione.
11. 6 - fluoro - 9α - iodo - Δ$^{4,6}$ - pregnadien - 11β - ol-3,20-dione.
12. 6 - bromo - 9α - fluoro - Δ$^{4,6}$ - pregnadien - 11β-ol-3,20-dione.
13. 6 - bromo - 9α - chloro - Δ$^{4,6}$ - pregnadien - 11β-ol-3,20-dione.

References Cited in the file of this patent
UNITED STATES PATENTS

| | | |
|---|---|---|
| 2,852,511 | Fried | Sept. 16, 1958 |
| 2,880,205 | Campbell et al. | Mar. 31, 1959 |
| 2,891,079 | Dodson et al. | June 16, 1959 |
| 2,897,199 | Ringold et al. | July 28, 1959 |